US010097324B2

(12) United States Patent
Behravan et al.

(10) Patent No.: US 10,097,324 B2
(45) Date of Patent: Oct. 9, 2018

(54) SRS TRANSMISSION IN PUSCH

(75) Inventors: Ali Behravan, Stockholm (SE); David Astely, Bromma (SE); George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1216 days.

(21) Appl. No.: 13/522,106

(22) PCT Filed: May 12, 2010

(86) PCT No.: PCT/SE2010/050523
§ 371 (c)(1),
(2), (4) Date: Jul. 13, 2012

(87) PCT Pub. No.: WO2011/090413
PCT Pub. Date: Jul. 28, 2011

(65) Prior Publication Data
US 2012/0294254 A1 Nov. 22, 2012

Related U.S. Application Data

(60) Provisional application No. 61/296,980, filed on Jan. 21, 2010.

(51) Int. Cl.
*H04L 5/00* (2006.01)
(52) U.S. Cl.
CPC .......... *H04L 5/0048* (2013.01); *H04L 5/0023* (2013.01); *H04L 5/0094* (2013.01)
(58) Field of Classification Search
None
See application file for complete search history.

(56) References Cited

U.S. PATENT DOCUMENTS

2009/0042616 A1* 2/2009 Teo et al. ................ 455/562.1
2009/0181687 A1* 7/2009 Tiirola et al. ............. 370/210
(Continued)

FOREIGN PATENT DOCUMENTS

| CN | 101436892 A | 5/2009 |
| EP | 2023503 A2 | 2/2009 |
| WO | 2008132047 A1 | 11/2008 |

OTHER PUBLICATIONS

3rd Generation Partnership Project. 3GPP TR 36.912 version 9.1.0 (Release 9) (Jan. 2010). 3LTE; Feasibility study for Further Advancements for E-UTRA (LTE-Advanced) (Release 9). European Telecommunications Standards Institute (ETSI). Sophia-Antipolis, France.
(Continued)

*Primary Examiner* — Steven H Nguyen
(74) *Attorney, Agent, or Firm* — Sage Patent Group

(57) ABSTRACT

The present invention uses user-specific resources, as allocated on the uplink, for conveying one or more antenna-specific sounding reference signals (SRSs). This technique advantageously permits, for example, a user equipment (UE) configured for uplink Multiple-Input-Multiple-Output (MIMO) operation to send antenna-specific SRSs within the granted resources allocated to the UE via one or more scheduled uplink grants. That is, within the granted resources allocated by a given uplink grant, a UE uses at least a portion of those resources for sending antenna-specific SRSs, rather than for sending uplink data (user traffic). Thus, in one or more embodiments, the present invention comprises a method at a UE of transmitting antenna-specific SRSs for two or more uplink transmit antennas. The method comprises transmitting an antenna-specific sounding reference signal for at least one of the uplink transmit antennas within a granted resource allocated (Continued)

to the user equipment for a scheduled uplink data transmission.

23 Claims, 3 Drawing Sheets

(56) References Cited

U.S. PATENT DOCUMENTS

| | | | |
|---|---|---|---|
| 2009/0316756 A1* | 12/2009 | Ro et al. | 375/133 |
| 2010/0034312 A1* | 2/2010 | Muharemovic et al. | 375/267 |
| 2010/0165930 A1* | 7/2010 | Zangi | 370/329 |
| 2010/0165972 A1* | 7/2010 | Lin et al. | 370/344 |
| 2010/0195532 A1* | 8/2010 | Pajukoski et al. | 370/254 |
| 2010/0246561 A1* | 9/2010 | Shin et al. | 370/345 |
| 2011/0142095 A1* | 6/2011 | Guo et al. | 375/133 |
| 2011/0261716 A1* | 10/2011 | Kim et al. | 370/252 |
| 2011/0274071 A1* | 11/2011 | Lee et al. | 370/329 |
| 2012/0178502 A1 | 7/2012 | Teo et al. | |
| 2012/0250742 A1* | 10/2012 | Tiirola et al. | 375/219 |
| 2012/0269146 A1* | 10/2012 | Pajukoski et al. | 370/329 |

OTHER PUBLICATIONS

NTT Docomo et al. 3GPP TSG RAN WG1 Meeting 48. "Closed Loop Antenna Switching in E-UTRA uplink". vol. R1-070860, No. 48. St. Louis, USA. Feb. 12, 2007.

Ericsson. TSG-RAN WG1 #47. "Uplink Reference Signals." R1-063128. Riga, Latvia. Nov. 6, 3006.

\* cited by examiner

SRS TRANSMISSION IN PUSCH

FIELD OF THE INVENTION

The present invention generally relates to sounding reference signals (SRSs), and particularly relates to the transmission of antenna-specific sounding reference signals using the granted resources allocated by one or more uplink scheduling grants.

BACKGROUND OF THE INVENTION

Using 3GPP LTE as an example wireless communication network context, sounding reference signals (SRSs) are known signals transmitted by mobile terminals or other items of user equipment (UE) to an eNodeB. In turn, the eNodeB uses SRSs to generate channel estimates used for uplink scheduling and link adaptation. Additionally, or alternatively, the channel estimates are used in controlling downlink multiple-antenna transmission, especially in case of Time Division Duplex (TDD), where the uplink and downlink use the same frequencies. Staying with the LTE context, the Technical Specification 3GPP TS 36.211 in part defines SRSs. According to that specification, SRSs have the duration of a single OFDM symbol. Further, the Technical Specification 3GPP TS 36.331 specifies the setup of SRS symbols, such as SRS bandwidth, SRS frequency domain position, SRS hopping pattern and SRS subframe configuration. These settings are configured semi-statically, according to signaling conveyed as Radio Resource Control (RRC) information element(s).

In a cell with a certain number of users, the period of SRS transmission is specified by the number of users and the bandwidth of SRS. When a large number of users share the SRS resources, the SRS period can become very large, which means less frequent channel estimation updates. While this large period might be good enough for many users, there might be some users with more time-variant channels, and therefore a need for more frequent SRS transmission.

In LTE Rel-8/Rel-9, resources for transmission of SRSs are reserved on a cell level in a static or semi-static fashion. Users in a cell are then semi-statically configured to transmit SRSs using the resources reserved in the cell. When resources are reserved for sounding, they are taken from the cell and hence from all users in the cell. This is opposite to the principle that each user device "pays" for its own sounding reference signal overhead.

Release 10 of the 3GPP LTE standard introduces Multiple-Input-Multiple-Output (MIMO) transmissions on the UL. The specifications provide that demodulation reference symbols (DMRS) are precoded (through the use of a multi-antenna weighting matrix, referred to as a precoder), whereas antenna-specific SRSs are transmitted without precoding, for use in channel estimation. Conventionally, SRS symbols from all antennas and all users share the same resources within a cell. Hence, there is a need to increase the resources for sounding reference signals in the cell. However, doing so using rel-8/9 principles takes resources from all users in the cell, despite the fact that the number of users needing more resources for sounding, such as users operating with multiple antenna transmission in the uplink, may be very small. To address the required SRS resources, in addition to periodic SRS transmission, aperiodic SRS transmission has been proposed as well. Similarly, aperiodic SRS transmission requires additional SRS resources, which undesirably consumes resources even from those users with no need for further SRS transmission, and therefore is unfair to some users.

SUMMARY

The present invention uses user-specific resources, as allocated on the uplink, for conveying one or more antenna-specific sounding reference signals (SRSs). This technique advantageously permits, for example, a user equipment (UE) configured for uplink Multiple-Input-Multiple-Output (MIMO) operation to send antenna-specific sounding reference signals (SRSs) within the granted resources allocated to the UE via one or more scheduled uplink grants. That is, within the granted resources allocated by a given uplink grant, a UE uses at least a portion of those resources for sending antenna-specific SRSs, rather than for sending uplink data (user traffic). Thus, in one or more embodiments, the present invention comprises a method at a UE of transmitting antenna-specific SRSs for two or more uplink transmit antennas. The method comprises transmitting an antenna-specific sounding reference signal for at least one of the uplink transmit antennas within a granted resource allocated to the user equipment for a scheduled uplink data transmission.

In another embodiment, the present invention comprises a UE that includes a transceiver for transmitting uplink signals to a supporting wireless communication network, and for receiving signals from the network, wherein the transceiver includes a MIMO uplink transmitter having two or more uplink transmit antennas for MIMO transmissions on the uplink. The UE further includes one or more transmit control circuits operatively associated with the transceiver and configured to transmit antenna-specific sounding reference signals for two or more uplink transmit antennas. Here, one or more of the transmit control circuits is particularly configured to transmit an antenna-specific SRS for at least one of the uplink transmit antennas within a granted resource allocated to the user equipment for a scheduled uplink data transmission.

In another embodiment, the present invention comprises a method at a network node of controlling SRS transmissions by a UE. The method comprises scheduling uplink transmissions by the user equipment and sending corresponding uplink grants to the user equipment. More particularly, the method comprises including control signaling within one or more of the uplink grants, to configure the transmission of one or more antenna-specific SRSs within the granted bandwidth allocated by at least one said uplink grant.

Correspondingly, in another embodiment, the present invention comprises a network node configured to control SRS transmissions by a UE. The network node comprises transceiver circuits configured to support downlink transmissions to a plurality of user equipments and to receive uplink transmissions from a plurality of user equipments, and one or more transmit control circuits operatively associated with the transceiver circuits. Advantageously, the transmit control circuit(s) are configured to schedule uplink transmissions by the user equipment and send corresponding uplink grants to the user equipment, and include control signaling within one or more of the uplink grants, to configure the transmission of one or more antenna-specific SRSs within the granted bandwidth allocated by at least one said uplink grant.

With the above in mind, those ordinarily skilled in the art will appreciate that, in one aspect of the present invention, a UE transmits additional antenna-specific reference signals (SRS) in a certain SC-FDMA symbol in an uplink subframe, instead of transmitting data. The parameters of the additional reference signals are determined from the parameters of the granted resources. For example, the bandwidth and/or frequency domain position of the additional reference signals may be determined from the bandwidth and/or frequency domain position of the granted references.

In another aspect, there is an advantageous recognition that a UE using MIMO uplink transmissions has additional SRSs to send (as compared to non-MIMO transmitters). In at least one such embodiment, the uplink resources used by a MIMO UE for sending its antenna-specific SRSs are taken from the uplink grants made to the user equipment. Thus, the UE will use, for example, at least some of the PUSCH resources granted to it for uplink data transmissions to send SRSs. The SRSs for two or more MIMO transmit antennas can be sent within the granted bandwidth of an uplink grant, using time-frequency resources within the grant that would otherwise be available for data transmission. In one example of this method, when using MIMO, the "normal" reference signals (demodulation reference signals) for channel estimation are precoded, and are used together with non-precoded (antenna-specific) SRSs. These SRSs are transmitted by the UE for all MIMO antennas of interest and one or more of them are sent within the bandwidth that is assigned to the UE for data.

DETAILED DESCRIPTION

One or more embodiments of the present invention provide a method to semi-statically or dynamically configure SRS transmission, based on users' need within the Physical Uplink Shared Channel (PUSCH), as defined in the LTE standards. In LTE Release 8/9, SRSs are transmitted over semi-statically assigned BWs and periods. However, with the adoption of uplink MIMO in Release 10, there are more UE antennas per user that must be accounted for in the transmission of antenna-specific SRSs. Depending on the time-variation and frequency selectivity of the involved channels some users/antennas may need a more frequent update of their channels than the others. The present invention addresses the need for variable SRS periodicity with its proposal for user-specific SRS transmissions on the PUSCH. In at least one embodiment taught herein, an eNodeB instructs a given UE to transmit additional antenna-specific SRSs, as needed, and the UE correspondingly transmits known reference signals from one or more of its antennas, instead of transmitting data for one or more SC_FDMA symbols, within the granted resources allocated to the UE for a scheduled uplink transmission on the PUSCH.

Figure 1:
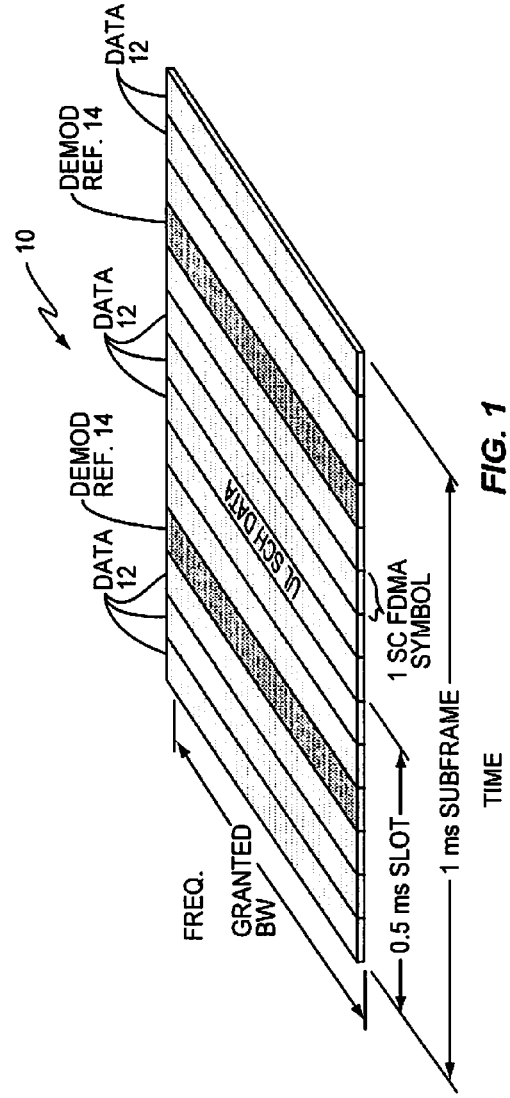
FIG. 1 is a diagram of a conventional allocation of granted (uplink) resources, wherein a UE sends data and demodulation reference symbols using the granted resources.

To understand this arrangement, FIG. 1 illustrates an example conventional case for LTE. Here, the granted resources 10 are time-frequency resources comprising a number of SC_FDMA sub-carriers and symbols times. In particular, one sees a 1 ms subframe that is divided into two 0.5 ms slots. Each slot comprises seven SC_FDMA symbols, and the illustration depicts the transmission of six data symbols 12 and one demodulation reference symbol 14 in each slot.

Figure 2:
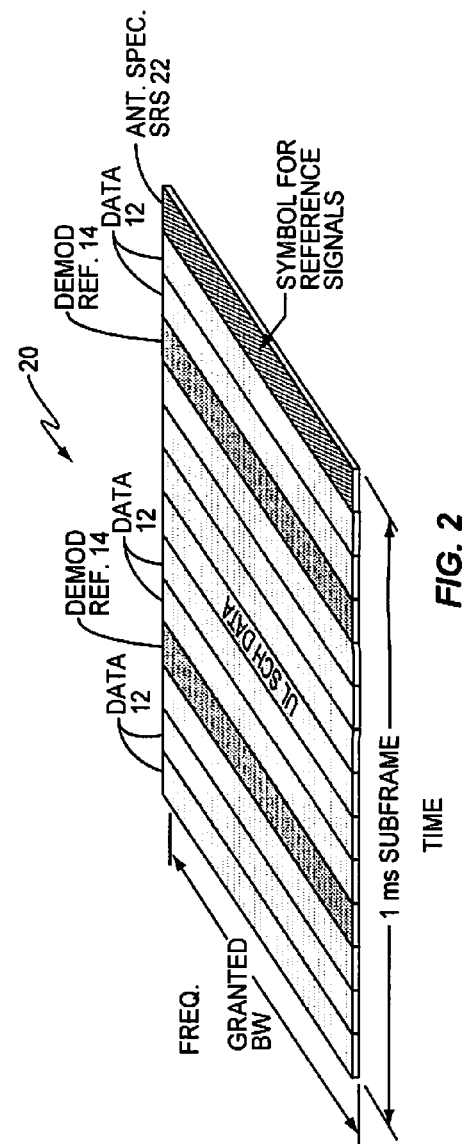
FIG. 2 is a diagram according to one embodiment of the present invention, wherein granted resources on the uplink are used to send one or more antenna-specific SRSs.

FIG. 2 depicts an example modification of the above arrangement, in accordance with one example contemplated by the present invention. Here, the granted resources on the PUSCH are denoted by the reference number "20." As before, the UE's scheduled uplink transmission with the granted resources on the PUSCH includes data symbols 12 and demodulation reference symbols 14. However, unlike the conventional transmission, the UE transmits one or more antenna-specific SRSs 22. In the illustrated example, one SC_FDMA symbol at the end of the 1 ms subframe is allocated to the transmission of an antenna-specific SRS. It will be understood that additional antenna-specific SRSs can be transmitted within the granted resources 20, at the expense of data capacity.

The additional SRSs can be mapped to every second subcarrier in the frequency domain, as is the case for the sounding reference signals defined for Rel-8/9 in LTE (using a so called repetition factor of 2), or be mapped to every subcarrier, as is the case with the uplink demodulation reference signals for Rel-8/9 in LTE. (See 3GPP TS 36.211 for further details.) Further, SRSs associated with different UE antennas may be code division multiplexed using different cyclic shifts of a certain sequence, such as a Zadoff Chu sequence (such as defined in 3GPP TS 36.211).

In more detail, for LTE, a 10 ms radio frame is divided into ten subframes with a duration of 1 ms. In each 1 ms subframe, 12 or 14 SC-FDMA symbols are transmitted on the uplink from a given scheduled UE, depending on whether normal or extended cyclic prefix length is used. For the case where the UE transmits one or more antenna-specific SRSs within the granted resources, the antenna-specific SRS symbol can be transmitted as the last symbol of the subframe—such as shown in FIG. 2. But this configuration is a non-limiting example. The number and placement of these additional antenna-specific SRS symbols within the granted resources can be configured dynamically or semi-statically. Furthermore, in at least one embodiment, the last symbol of a subframe may be used for transmission of Rel-8/9 sounding reference signals, whereas another symbol, such as the second to last symbol can be used for the transmission of an additional antenna-specific SRS, as taught herein. In such a case, at least two symbols within the subframe are not used for data but rather for the transmission of reference signals, which are not precoded in the same way as the data on PUSCH.

More broadly, according to at least one embodiment of the present invention, parameters such as the frequencies used for the transmission of antenna-specific SRSs within granted resources, are determined from the parameters of the data transmission. In a preferred but non-limiting embodiment, the bandwidth of the additional SRSs is the same or smaller than the bandwidth of the data transmission on PUSCH in the uplink. When SRS transmission is semi-statically configured in PUSCH, the particular resources are set by higher layers, e.g. as part of RRC information element—see 3GPP TS 36.331.

In the case of dynamic configuration, the information regarding the uplink scheduling grant for a given grant to a given UE can be sent within the downlink control information (DCI) format 0—see 3GPP TS 36.212. DCI is carried by the physical downlink control channel (PDCCH), which is sent over the first one to three OFDM symbols in each subframe. This arrangement means that within the context of the present invention the dynamics of SRS configuration (whether SRS is transmitted in PUSCH or not) can have a resolution as high as every subframe.

The instruction can be as simple as just one bit indicating whether there is an SRS transmission or not within a given grant of uplink resources. Alternatively, the network may send, and a targeted UE may receive, instructions specifying the bandwidth, periodicity, etc., of dynamic SRS transmissions—i.e., a given UE may be dynamically instructed as to how/when antenna-specific SRSs are to be transmitted within granted resources on the uplink. As the transmission of the additional SRS(s) is within the scheduled bandwidth of the user, such transmissions only affect the PUSCH of the corresponding user. As such, the present invention provides an arrangement that is backward compatible with conventional arrangements. Thus, an advantageous aspect of one or more embodiments of the present invention is that when a given UE transmits additional antenna-specific SRSs in support of MIMO-based data transmissions on the uplink, the bandwidth and the frequency domain location of the additional SRSs is determined from the parameters of the UE's PUSCH transmission.

Figure 3:
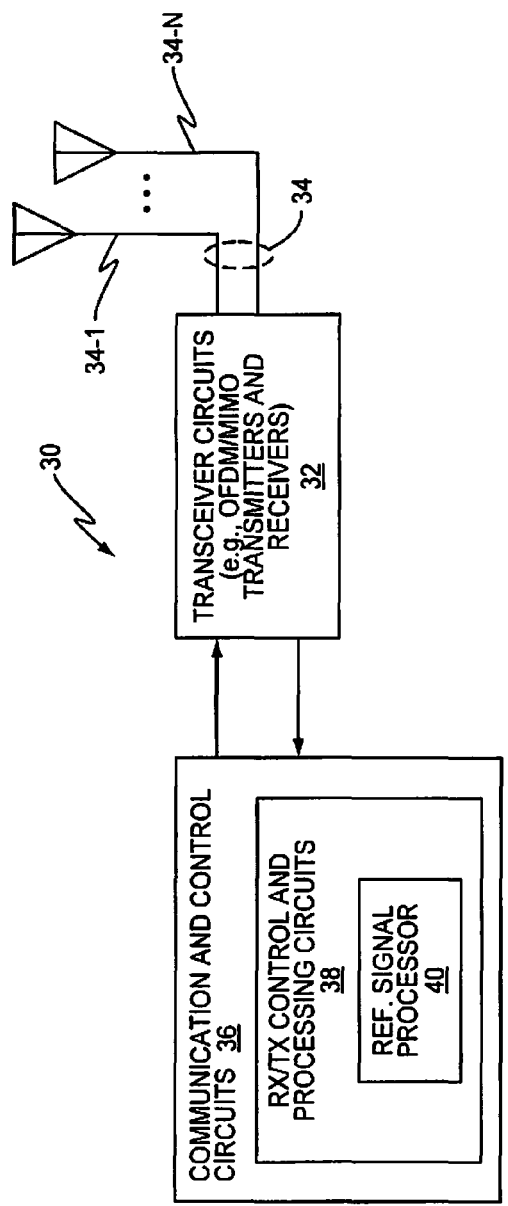
FIG. 3 is a block diagram of one embodiment of a UE that is configured to send one or more antenna-specific SRSs within granted resources allocated by one or more uplink scheduling grants.

With the above examples in mind, FIG. 3 illustrates an example UE 30 according to one or more embodiments of the present invention. The UE includes a transceiver 32 for transmitting uplink signals to a supporting wireless communication network (not shown in FIG. 3), and for receiving signals from the network. The transceiver 32 includes a MIMO uplink transmitter having two or more uplink transmit antennas 34 (e.g., 34-1, . . . , 34-N) for MIMO transmissions on the uplink, and further includes one or more transmit control circuits 36 that are operatively associated with the transceiver 32.

In particular, the circuits 36 include RX/TX control and processing circuits 38, including a reference signal processor 40. These circuits are configured to transmit antenna-specific SRSs for two or more uplink transmit antennas 34, and they are particularly configured to transmit an antenna-specific SRS for at least one of the uplink transmit antennas 34 within a granted resource allocated to the UE 30 for a scheduled uplink data transmission.

In at least one embodiment, UE 30 comprises an LTE communication terminal, such as a cellular radiotelephone, a smart phone, a PDA, a laptop computer, a wireless network adaptor, or essentially any other type of wireless communication device.

Further, in at least one embodiment, the UE 30 is configured to transmit an antenna-specific SRS responsive to control signaling included in an earlier-received uplink scheduling grant allocating the granted resources in which the antenna-specific SRS is transmitted.

Further, in at least one embodiment, the UE 30 is further configured to perform MIMO transmissions of one or more demodulation reference signals and data signals within the granted resource, in addition to the transmission of one or more antenna-specific SRSs—i.e., within a given set of granted resources, the UE 30 transmits data symbols and demodulation reference symbols, along with one or more antenna-specific SRSs.

Further, in at least one embodiment, the UE 30 is configured to transmit sounding reference signals for a first MIMO uplink antenna of the UE 30 at bandwidths determined by Radio Resource Control (RRC) signaling received by the UE 30, and to transmit sounding reference signals for a second MIMO uplink antenna of the UE 30 within the granted resources allocated to the user equipment on the PUSCH of an LTE network. In other words, the UE 30 transmits one or more antenna-specific SRSs according to convention, and transmits one or more antenna-specific SRSs within granted resources, according to the present invention.

In at least one such embodiment, the UE 30 is configured to configure its transmission of the sounding reference signals for the second MIMO uplink antenna based on control signaling in uplink scheduling grants received by the UE 30 for its transmissions on the PUSCH. In a particular embodiment, the UE 30 is configured to transmit one or more antenna-specific SRSs, according to Radio Resource Control (RRC) signaling received by the UE 30, and transmit one or more antenna-specific SRSs within granted resources, according to control signaling received by the user equipment for uplink grants allocating said granted resources.

Of course, the UE 30 also may transmit one or more demodulation reference signals within the granted resource, along with transmitting antenna-specific SRSs for one or more MIMO uplink transmit antennas within the granted resource. As noted for the LTE context, the granted resource may be an uplink grant on the PUSCH of an LTE network, where the demodulation reference signals are pre-coded by the UE 30 and antenna-specific SRSs are not precoded.

Figure 4:
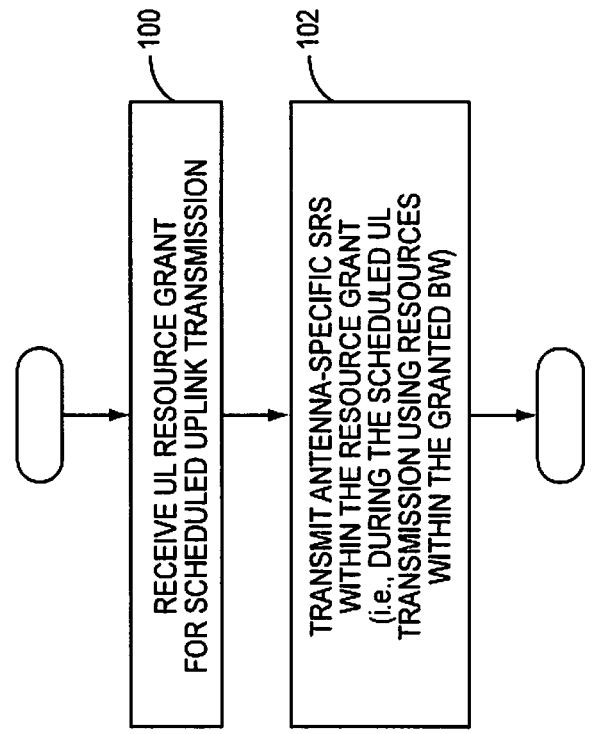
FIG. 4 is a logic flow diagram of one embodiment of sending antenna-specific SRSs within granted resources on the uplink.

FIG. 4 illustrates an example UE method, which may be carried out by the UE 30 of FIG. 3, for example. The illustrated method includes a UE receiving an UL resource grant for a scheduled uplink data transmission (Step 100), and correspondingly transmitting an antenna-specific SRS for at least one of the uplink transmit antennas within a granted resource allocated to the user equipment for the scheduled uplink data transmission (Step 102). In other words, the UE substitutes one or more antenna-specific SRSs in place of data symbol transmissions, within the granted resources that were allocated to it in a received uplink scheduling grant. In at least one such embodiment, such transmitting is done responsive to control signaling included in an earlier-received uplink scheduling grant allocating said granted resource.

To support such methods and configurations at the UE, the supporting wireless communication network is configured to provide control signaling and to properly interpret antenna-specific SRSs, as carried within the granted resources allocated to a given UE, via one or more uplink scheduling grants made to the UE. In particular, a network node is configured to control SRS transmissions by a UE.

Figure 5:
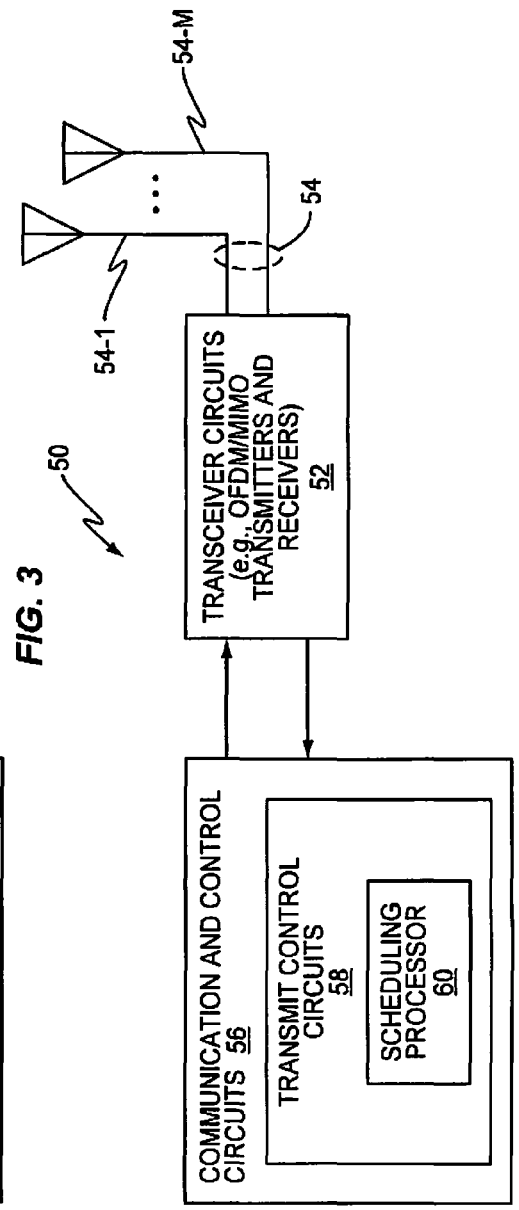
FIG. 5 is a block diagram of one embodiment of a network node that is configured to configure one or more UEs to send one or more antenna-specific SRSs within granted resources allocated by one or more uplink scheduling grants sent from the node.

FIG. 5 illustrates one embodiment of such a network node, which may be an eNodeB in an LTE context, for example. The illustrated node 50 comprises transceiver circuits 52 that are configured to support downlink transmissions to a plurality of UEs and to receive uplink transmissions from a plurality of UEs. To this end, the node 50 includes a number of transmit/receive antennas 54 (e.g., 54-1, . . . , 54-M).

The network node 50 further includes one or more communication processing and control circuits 56 that are operatively associated with the transceiver circuits 52. In particular, these circuits 56 include transmit control circuits 58, including a scheduling processor 60, which are configured to schedule uplink transmissions by the UEs and send corresponding uplink grants to the UEs. Further, the transmit control circuits 56 are configured to include control signaling within one or more of the uplink grants, to configure the transmission of one or more antenna-specific SRSs within the granted bandwidth allocated by at least one said uplink grant.

Figure 6:
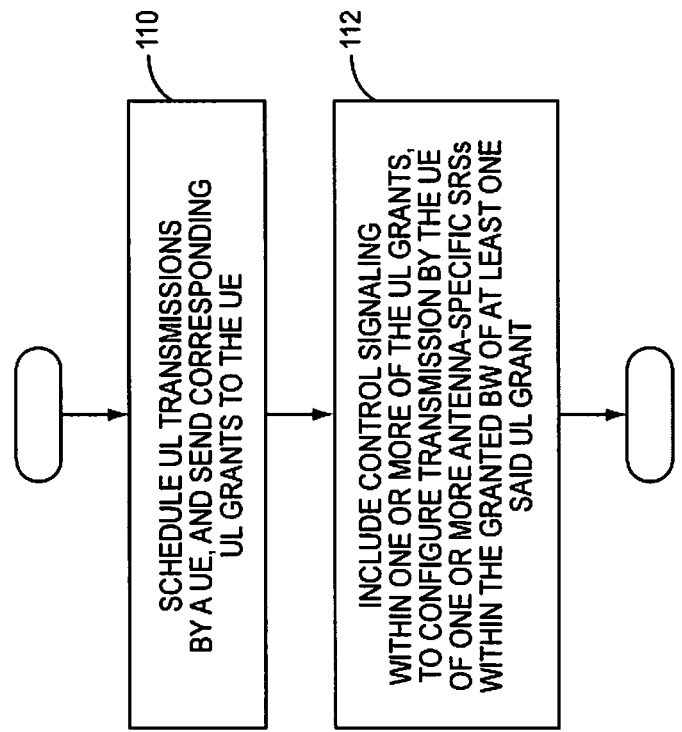
FIG. 6 is a logic flow diagram of one embodiment of configuring a UE to send antenna-specific SRSs within granted resources on the uplink.

FIG. 6 illustrates a corresponding method for implementation at the network node 50 of FIG. 5, for example. The illustrated method provides for controlling SRS transmissions by a user equipment, and comprises: scheduling uplink transmissions by the user equipment and sending corresponding uplink grants to the user equipment (Step 110), and including control signaling within one or more of the uplink grants, to configure the transmission of one or more antenna-specific SRSs within the granted bandwidth allocated by at least one said uplink grant (Step 112).

In at least one embodiment, the method includes receiving a scheduled uplink transmission from a UE, and performing channel quality estimation or frequency-selective scheduling determinations based at least in part on any SRSs received within the granted bandwidth of the scheduled uplink transmission. In at least one such embodiment, performing channel quality estimation or frequency-selective scheduling determinations further includes processing SRSs received from the UE outside the granted bandwidth of the scheduled uplink transmission. That is, the UE transmits one or more antenna-specific SRSs outside granted resources and one or more within granted resources (possibly at different times) and the network node is configured to process all such SRSs, as needed. In any case, in at least one embodiment, the UE includes a MIMO uplink transmitter, and the method includes receiving antenna-specific sounding reference signals for one or more MIMO transmit antennas of the user equipment within the granted bandwidth allocated by one or more uplink grants made to the UE.

Of course, those skilled in the art will appreciate that the example UE 30 and network node 50 each may be implemented using microcontrollers and/or digital signal processors (or other computer processors) that are configured to carry out the methods and associated processing described herein, based on executing stored computer program instructions. It will be understood that, in this regard, the illustrated node 50 and UE 30 are specially adapted, based on said program execution, to perform the method(s) described herein.

Among its other advantages, the invention increases the amount of resources available for sounding in a backwards compatible fashion because additional sounding resources can be allocated from resources that are allocated for data transmission. Furthermore, this approach has the further advantage of taking the resources used for sending additional reference signals only from specific user allocated uplink resources. Thus, only the users that need to send additional sounding bear the additional signaling overhead burden.

What is claimed is:

1. A method in a user equipment of transmitting antenna-specific sounding reference signals for two or more uplink transmit antennas, said method comprising:

transmitting a non-precoded antenna-specific sounding reference signal for each of at least one of the uplink transmit antennas within and confined to a granted resource allocated to the user equipment for a scheduled uplink transmission of user traffic.

2. The method of claim 1, wherein said transmitting is done responsive to control signaling included in an earlier-received uplink scheduling grant allocating said granted resource.

3. The method of claim 1, wherein the user equipment comprises a MIMO transmitter, and wherein the method comprises performing MIMO transmissions of demodulation reference signals and data signals within the granted resource, and further performing transmissions of the non-precoded antenna-specific sounding reference signal for the at least one uplink transmit antenna within the granted resource.

4. The method of claim 1, wherein the method comprises transmitting sounding reference signals for a first MIMO uplink antenna of the user equipment using bandwidths determined by Radio Resource Control (RRC) signaling received by the user equipment, and transmitting non-precoded antenna-specific sounding reference signals for a second MIMO uplink antenna of the user equipment within and confined to granted bandwidths allocated to the user equipment on the Physical Uplink Shared Channel (PUSCH) of an LTE network.

5. The method of claim 4, further comprising configuring transmission of the non-precoded antenna-specific sounding reference signals for the second MIMO uplink antenna based on control signaling in uplink scheduling grants received by the user equipment for its transmissions on the PUSCH.

6. The method of claim 1, wherein the method comprises transmitting one or more antenna-specific sounding reference signals, according to Radio Resource Control (RRC) signaling received by the user equipment, and transmitting one or more antenna-specific sounding reference signals within and confined to granted resources, according to control signaling received by the user equipment for uplink grants allocating said granted resources.

7. The method of claim 1, wherein the user equipment includes a MIMO transmitter for MIMO uplink transmissions, and wherein the user equipment is configured to transmit one or more demodulation reference signals within the granted resource and is further configured to transmit non-precoded antenna-specific sounding reference signals for each of at least one MIMO uplink transmit antenna, within and confined to the granted resource.

8. The method of claim 7, wherein said granted resource is an uplink grant on the PUSCH of an LTE network, and wherein said demodulation reference signals are pre-coded.

9. A user equipment comprising:
a transceiver for transmitting uplink signals to a supporting wireless communication network, and for receiving signals from the network, said transceiver including a MIMO uplink transmitter having two or more uplink transmit antennas for MIMO transmissions on the uplink; and
one or more transmit control circuits operatively associated with the transceiver and configured to transmit non-precoded antenna-specific sounding reference signals for two or more uplink transmit antennas, said one or more transmit control circuits particularly configured to transmit a non-precoded antenna-specific sounding reference signal for each of at least one of the uplink transmit antennas within and confined to a granted resource allocated to the user equipment for a scheduled uplink transmission of user traffic.

10. The user equipment of claim 9, wherein the user equipment comprises an LTE communication terminal.

11. The user equipment of claim 9, wherein the user equipment is configured to transmit the non-precoded antenna-specific sounding reference signal for the at least one uplink transmit antenna responsive to control signaling included in an earlier-received uplink scheduling grant allocating said granted resource.

12. The user equipment of claim 9, wherein the user equipment is further configured to perform MIMO transmissions of one or more demodulation reference signals and data signals within the granted resource.

13. The user equipment of claim 9, wherein the user equipment is configured to transmit sounding reference signals for a first MIMO uplink antenna of the user equipment using bandwidths determined by Radio Resource Control (RRC) signaling received by the user equipment, and to transmit non-precoded antenna-specific sounding reference signals for a second MIMO uplink antenna of the user equipment within and confined to granted bandwidths allocated to the user equipment on the PUSCH of an LTE network.

14. The user equipment of claim 13, wherein the user equipment is configured to configure its transmission of the non-precoded antenna-specific sounding reference signals for the second MIMO uplink antenna based on control signaling in uplink scheduling grants received by the user equipment for its transmissions on the PUSCH.

15. The user equipment of claim 9, wherein the user equipment is configured to transmit one or more antenna-specific sounding reference signals, according to Radio Resource Control (RRC) signaling received by the user equipment, and transmit one or more antenna-specific sounding reference signals within and confined to granted resources, according to control signaling received by the user equipment for uplink grants allocating said granted resources.

16. The user equipment of claim 9, wherein the user equipment is configured to transmit one or more demodulation reference signals within the granted resource, and is further configured to transmit non-precoded antenna-specific sounding reference signals for one or more MIMO uplink transmit antennas, within and confined to the granted resource.

17. The user equipment of claim 16, wherein said granted resource is an uplink grant on the PUSCH of an LTE network, and wherein said demodulation reference signals are pre-coded.

18. A method at a network node of controlling sounding reference signal transmissions by a user equipment, said method comprising:
scheduling uplink transmissions by the user equipment and sending corresponding uplink grants to the user equipment; and
including control signaling within one or more of the uplink grants, to configure the transmission of one or more non-precoded antenna-specific sounding reference signals within and confined to the granted bandwidth allocated by at least one said uplink grant.

19. The method of claim 18, further comprising receiving a scheduled uplink transmission from the user equipment, and performing channel quality estimation or frequency-selective scheduling determinations based at least in part on any non-precoded antenna-specific sounding reference signals received within and confined to the granted bandwidth of the scheduled uplink transmission.

20. The method of claim 19, wherein performing channel quality estimation or frequency-selective scheduling determinations further includes processing one or more sounding reference signals received from the user equipment outside the granted bandwidth of the scheduled uplink transmission.

21. The method of claim 18, wherein the user equipment includes a MIMO uplink transmitter, and wherein the method includes receiving non-precoded antenna-specific sounding reference signals for one or more MIMO transmit antennas of the user equipment within and confined to the granted bandwidth allocated by one or more uplink grants made to the user equipment.

22. A network node configured to control sounding reference signal transmissions by a user equipment, said network node comprising:
transceiver circuits configured to support downlink transmissions to a plurality of user equipments and to receive uplink transmissions from a plurality of user equipments; and
one or more transmit control circuits operatively associated with the transceiver circuits and configured to:
schedule uplink transmissions by the user equipment and sending corresponding uplink grants to the user equipment; and
include control signaling within one or more of the uplink grants, to configure the transmission of one or more non-precoded antenna-specific sounding reference signals within and confined to the granted bandwidth allocated by at least one said uplink grant.

23. The node of claim 22, wherein said node comprises an eNB configured for operation in an LTE network.

* * * * *